United States Patent
Salter et al.

(10) Patent No.: US 10,118,538 B2
(45) Date of Patent: Nov. 6, 2018

(54) ILLUMINATED RACK

(71) Applicant: Ford Global Technologies, LLC, Dearborn, MI (US)

(72) Inventors: Stuart C. Salter, White Lake, MI (US); Paul Kenneth Dellock, Northville, MI (US); Mehran Niksimaee, Orchard Lake Village, MI (US); Annette Lynn Huebner, White Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/371,568

(22) Filed: Dec. 7, 2016

(65) Prior Publication Data
US 2018/0154822 A1 Jun. 7, 2018

(51) Int. Cl.
*B60Q 1/26* (2006.01)
*B60Q 1/50* (2006.01)
*H05B 33/08* (2006.01)
*H05B 37/02* (2006.01)

(52) U.S. Cl.
CPC .............. *B60Q 1/2611* (2013.01); *B60Q 1/50* (2013.01); *H05B 33/0854* (2013.01); *H05B 37/0227* (2013.01); *B60Q 2400/10* (2013.01)

(58) Field of Classification Search
None
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,434,013 A | 7/1995 | Fernandez | |
| 5,709,453 A | 1/1998 | Krent et al. | |
| 5,839,718 A | 11/1998 | Hase et al. | |
| 5,877,681 A * | 3/1999 | Williams | B60Q 1/26 340/468 |
| 6,031,511 A | 2/2000 | DeLuca et al. | |
| 6,114,954 A * | 9/2000 | Palett | B60R 9/00 224/321 |
| 6,117,362 A | 9/2000 | Yen et al. | |
| 6,260,988 B1 | 7/2001 | Misawa et al. | |
| 6,294,990 B1 | 9/2001 | Knoll et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |

(Continued)

FOREIGN PATENT DOCUMENTS

CN 101337492 A 1/2009
CN 201169230 Y 2/2009

(Continued)

*Primary Examiner* — Thomas McCormack
(74) *Attorney, Agent, or Firm* — Jason Rogers; Price Heneveld LLP

(57) ABSTRACT

A vehicle roof rack includes a first side-rail and a second side-rail. Each of the rails define a first groove and a second groove. The second is defined below the first groove. A plurality of lights are positioned within the second groove. A cross-rail extends between the first and second side rails and is positioned within the first grooves.

7 Claims, 7 Drawing Sheets

(56) References Cited

U.S. PATENT DOCUMENTS

| | | | |
|---|---|---|---|
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,354,182 B2 | 4/2008 | Bartels |
| 7,441,914 B2 | 10/2008 | Palmer et al. |
| 7,458,698 B2 | 12/2008 | Heathcock et al. |
| 7,501,749 B2 | 3/2009 | Takeda et al. |
| 7,575,349 B2 | 8/2009 | Bucher et al. |
| 7,589,622 B2 | 9/2009 | Farley |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,876,205 B2 | 1/2011 | Catten et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,240,526 B2 * | 8/2012 | Kim .................. B60R 9/05 224/309 |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,765 B2 | 4/2013 | Kuhlman et al. |
| 8,408,766 B2 | 4/2013 | Wilson et al. |
| 8,414,168 B2 | 4/2013 | Jutila et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,922,388 B2 | 12/2014 | Nykerk |
| 8,937,454 B2 | 1/2015 | Baarman et al. |
| 8,952,341 B2 | 2/2015 | Kingsley et al. |
| 8,963,705 B2 | 2/2015 | Miller et al. |
| 8,985,414 B2 | 3/2015 | Aftanas |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,194,168 B1 | 11/2015 | Lu et al. |
| 9,290,123 B2 | 3/2016 | Salter et al. |
| 9,299,887 B2 | 3/2016 | Lowenthal et al. |
| 9,315,148 B2 | 4/2016 | Schwenke et al. |
| 9,442,888 B2 | 9/2016 | Stanfield et al. |
| 9,568,659 B2 | 2/2017 | Verger et al. |
| 9,579,987 B2 | 2/2017 | Penilla et al. |
| 9,616,812 B2 | 4/2017 | Sawayanagi |
| 2002/0159741 A1 | 10/2002 | Graves et al. |
| 2002/0163792 A1 | 11/2002 | Formosa |
| 2003/0167668 A1 | 9/2003 | Fuks et al. |
| 2003/0179548 A1 | 9/2003 | Becker et al. |
| 2003/0228990 A1 * | 12/2003 | Lee .................. C11D 3/30 510/202 |
| 2004/0213088 A1 | 10/2004 | Fuwausa |
| 2004/0239243 A1 * | 12/2004 | Roberts .................. B60L 1/14 313/512 |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Gally et al. |
| 2013/0050979 A1 | 2/2013 | Van De Ven et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0288832 A1 | 9/2014 | Hoch et al. |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0082880 A1 | 3/2016 | Co et al. |
| 2016/0102819 A1 | 4/2016 | Misawa et al. |
| 2016/0131327 A1 | 5/2016 | Moon et al. |
| 2016/0214535 A1 | 7/2016 | Penilla et al. |
| 2016/0236613 A1 | 8/2016 | Trier |

(56) References Cited

U.S. PATENT DOCUMENTS

2017/0158125 A1 6/2017 Schuett et al.
2017/0213165 A1 7/2017 Stauffer et al.

FOREIGN PATENT DOCUMENTS

| | | |
|---|---|---|
| CN | 201193011 Y | 2/2009 |
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2014068440 A1 | 5/2014 |
| WO | 2014161927 A1 | 10/2014 |

* cited by examiner

ILLUMINATED RACK

FIELD OF THE INVENTION

The present disclosure generally relates to vehicles racks, and more particularly relates to illuminated vehicle roof racks.

BACKGROUND OF THE INVENTION

Vehicles utilizing illumination on roof racks may offer a variety of utility and aesthetic benefits. Accordingly, incorporating illuminated roof racks in vehicles may be advantageous.

SUMMARY OF THE DISCLOSURE

According to one aspect of the present disclosure, a vehicle roof rack includes a first side-rail and a second side-rail. Each of the rails define a first groove and a second groove. The second is defined below the first groove. A plurality of lights are positioned within the second groove. A cross-rail extends between the first and second side rails and is positioned within the first grooves.

According to another aspect of the present disclosure, a method of illuminating a vehicle rack includes the steps of detecting a status of a vehicle; illuminating a plurality of light sources positioned within a groove of the vehicle rack in a first illumination state; and altering the illumination of the light sources to a second illumination state based on the detection of a change in the status of the vehicle.

According to yet another aspect of the present disclosure, a method of illuminating a vehicle roof rack includes the steps of detecting an occupancy status of the vehicle; illuminating a plurality of light sources positioned on the vehicle rack; and altering the illumination from the plurality of light sources based on occupancy status of the vehicle.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1A:
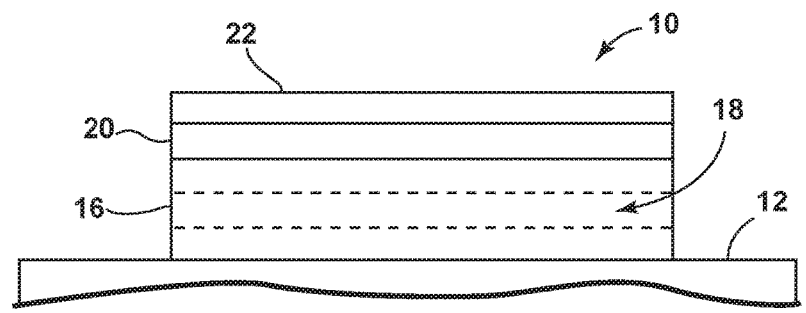
FIG. 1A is a side view of a photoluminescent structure rendered as a coating for use in an assembly according to one embodiment.
Figure 1B:
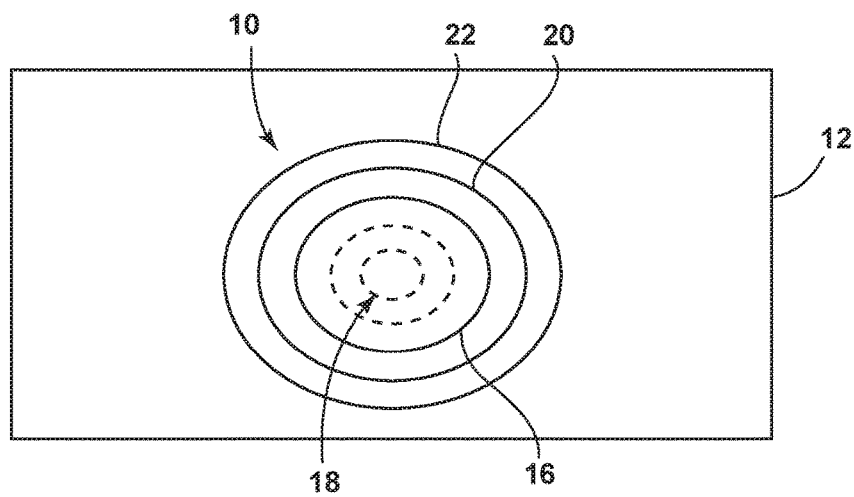
FIG. 1B is a top view of a photoluminescent structure rendered as a discrete particle according to one embodiment.
Figure 1C:
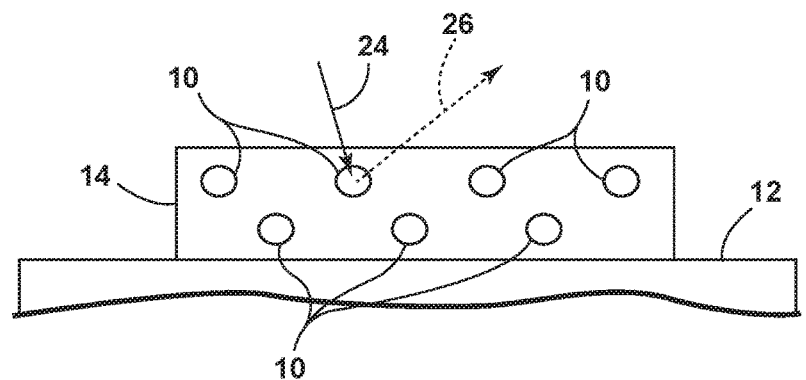
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Figure 3A:
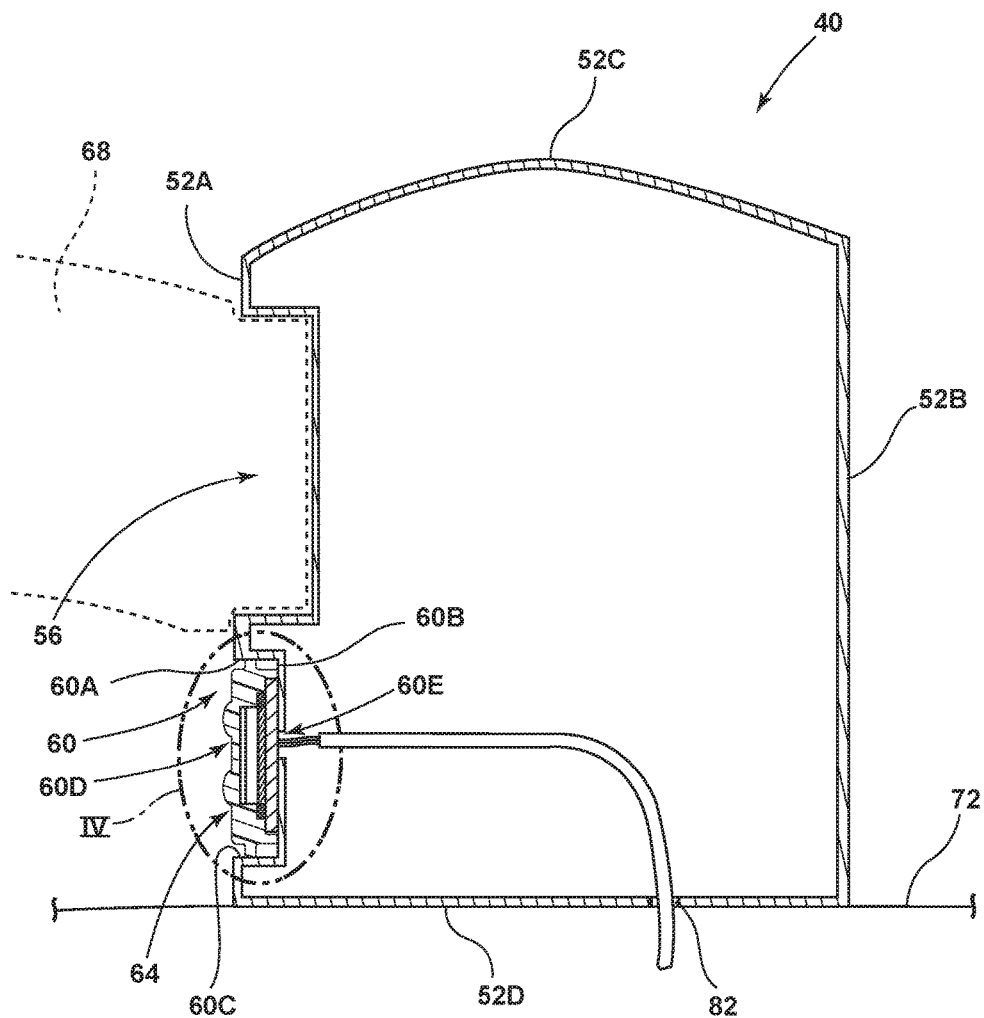
FIG. 3A is a cross-sectional view taken at line of FIG. 2, according to one example.
Figure 3B:
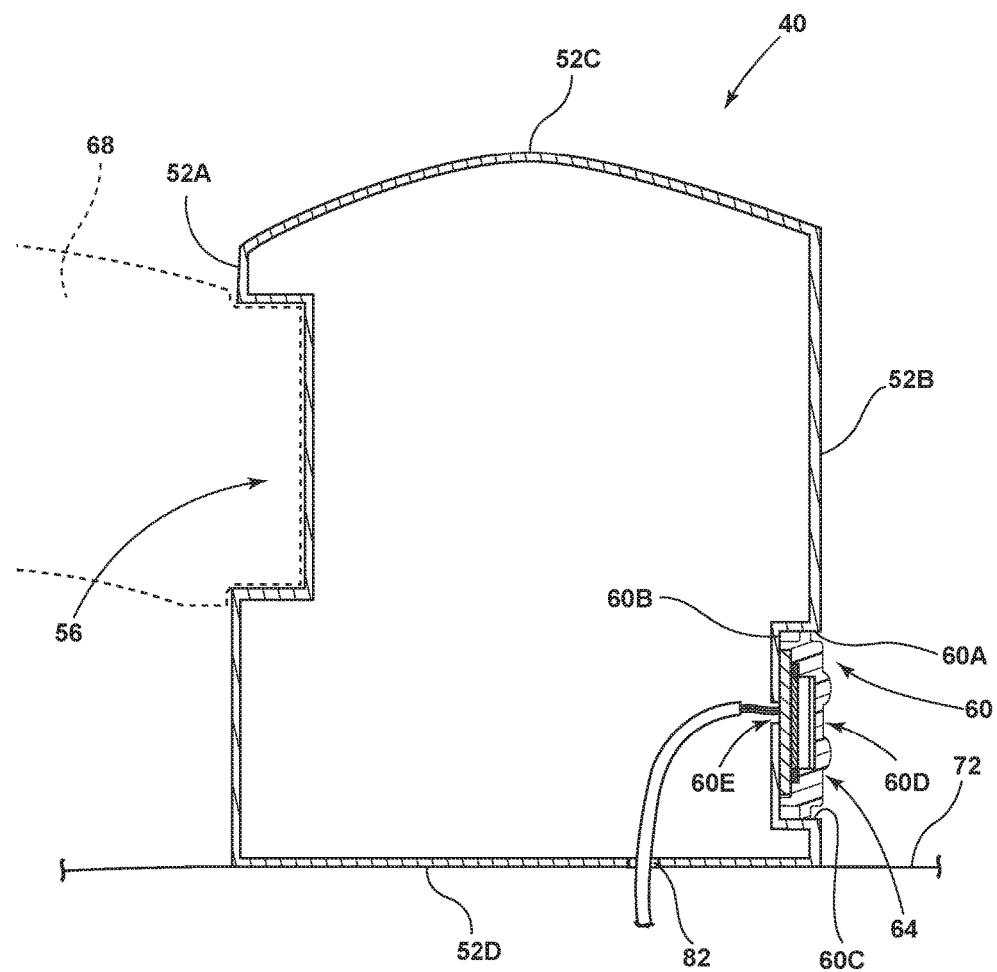
FIG. 3B is a cross-sectional view taken at line of FIG. 2, according to another example.

Light emitted by the sun, ambient sources and/or a light source 104 (FIG. 3) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emit the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring now to FIGS. 2-5, depicted is a vehicle 40 including a roof rack 44. The roof rack 44 includes a first side rail 48 and a second side rail 52. Each of the rails 48, 52 include a first groove 56 and a second groove 60. In the depicted examples, the second groove 60 is positioned below the first groove 56, but it will be understood that in alternative examples, the second groove 60 may be positioned above the first groove 56. A plurality of light assemblies 64 are positioned within the second groove 60. One or more cross-rails 68 extend between the first and second side rails 48, 52. The one or more cross-rails 68 are positioned within the first grooves 56 of the first and second side rails 48, 52.

Figure 2:
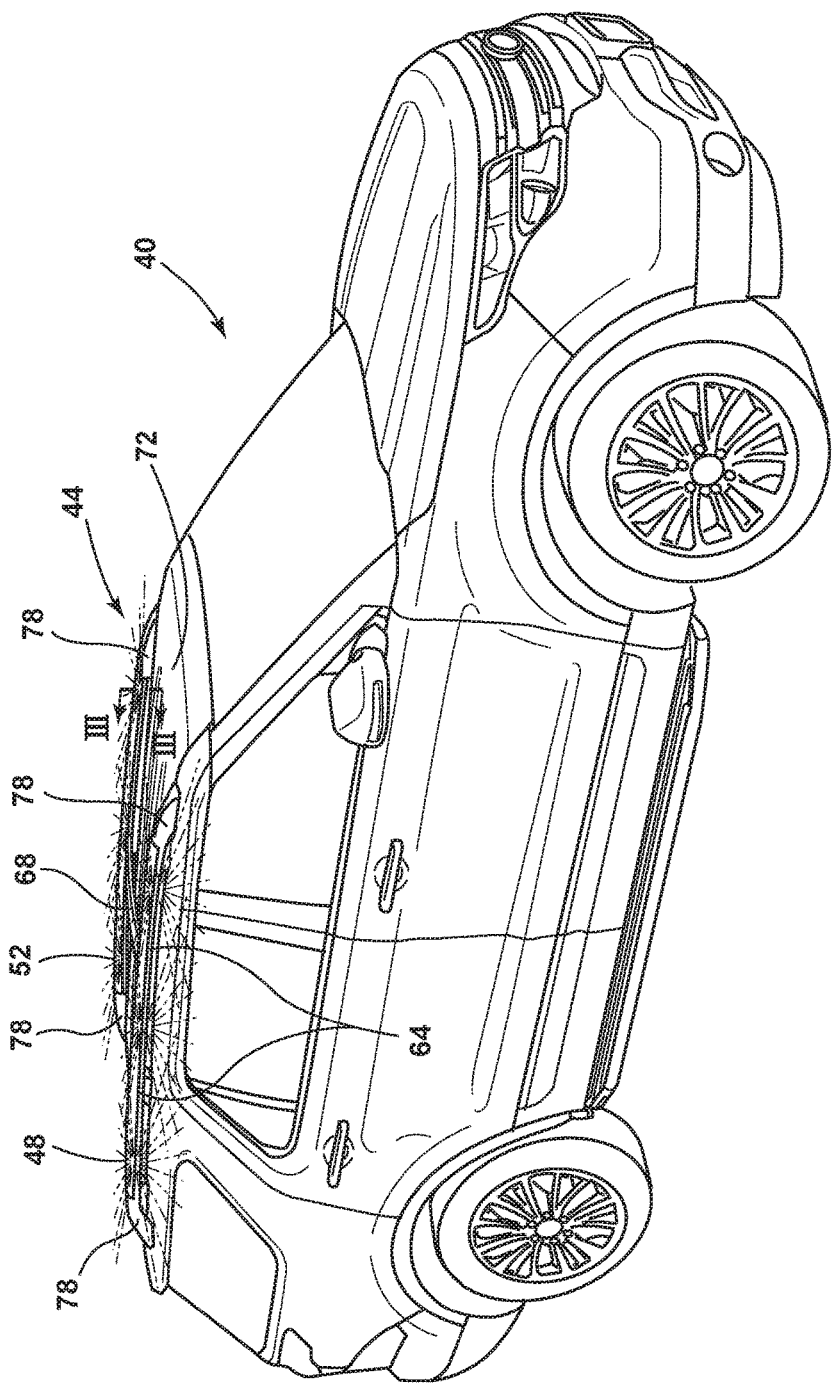
FIG. 2 is a perspective view of a vehicle, according to one example.

Referring now to FIG. 2, the vehicle 40 is depicted as a sport utility vehicle, but it will be understood that the vehicle 40 may alternatively be a van, truck, sedan, crossover vehicle, or other types of vehicles 40 incorporating roof racks 44. The roof rack 44 is positioned on a roof 72 of the vehicle 40. Although described as a roof rack 44, it will be understood that the roof rack 44 may alternatively be known as a luggage rack. It will be understood that the description below of the roof rack 44 may equally be applied to other racks positioned on and around the vehicle 40. For example, the description of the roof rack 44 may equally be applied to a tire rack positioned on a rear of the vehicle 44, as well as to other racks positioned around an exterior and/or interior of the vehicle 40. The roof rack 44 is coupled to the roof 72 through attachment points 78. In the depicted example, the roof rack 44 is coupled to the roof 72 with four attachment points 78, but it will be understood that the roof rack 44 may include less than four attachment points 78 (e.g., three) or greater than four attachment points 78 (e.g., five or more). The attachment points 78 may be bolted to the roof 72 such that the roof rack 44 does not move when loaded with cargo.

The first and second side-rails 48, 52 extend between the attachment points 78 and the cross-rails 68 extend between the first and second side-rails 48, 52. The first and second side-rails 48, 52 may extend into the attachment points 78 such that ends of the side rails 48, 52 are covered and/or surrounded by the attachment points 78. In the depicted example, the first and second side-rails 52, 48 extend between two attachment points 78, but it will be understood more attachment points 78 may be positioned along the length of the side-rails 48, 52 (e.g., for greater stability). Further, one or more of the cross-rails 68 may include an attachment point 78 (e.g., for greater stability). In the depicted example, the first and second side-rails 48, 52 extend in a lengthwise direction along the vehicle 40 (i.e., in vehicle forward and rearward directions), but may additionally or alternatively extend between a passenger side and a driver side of the vehicle 40 (i.e., across a width of the vehicle 40). In such an example, the cross-rails 68 may extend in the vehicle forward and rearward directions. Further, in the depicted example, the first and second side-rails 48, 52 extend above the roof 72, but may additionally or alternatively extend in contact with the roof 72 of the vehicle 40. The first and second side rails 48, 52 may define a curvature or sweep over the length of the rails 48, 52. Similarly to the first and second side-rails 48, 52, the cross-rails 68 may define a curvature or sweep extending away from the roof 72 of the vehicle 40. The side rails 48, 52 and/or the cross-rails 68 may be translucent, transparent or define portions which are translucent and/or transparent.

The roof rack 44 includes a plurality of light assemblies 64. In the depicted example, each of the first and second side-rails 48, 52 includes two lights assemblies 64 (i.e., four lights assemblies 64 total). In the depicted example, each light assembly 64 extends for half of the length of each of the first and second side-rails 48, 52 such that the light assemblies 64 of the roof rack 44 are divided into quadrants. It will be understood that each of the light assemblies 64 may have a different length, or that some of the light assemblies 64 may have the same length. Further, it will be understood that a single light assembly 64 may extend a portion, or the entire length of each of the first and second side-rails 48, 52. As explained in greater detail below, the light assemblies 64 may be activated individually, or in concert, to communicate one or more statuses (e.g., speed, direction of travel, turning, occupancy status, reservation status, etc.), or alterations of a status, of the vehicle 40 to persons positioned around the vehicle 40. Incorporation of one or more of the light assemblies 64 allows the roof rack 44 to be an illuminated roof rack 44.

Figure 4:
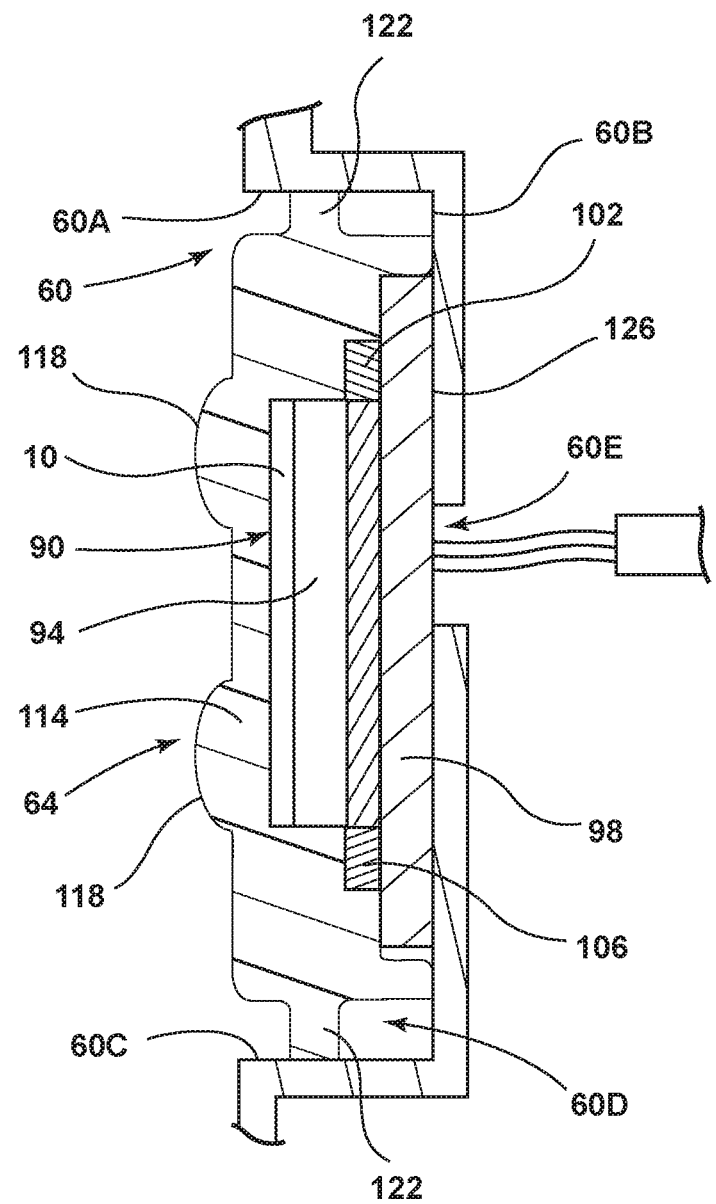
FIG. 4 is an enhanced view of a light strip positioned on the roof rack, according to one example.

Referring now to FIGS. 2-4, the first and second side-rails 48, 52 define an inboard side 52A, an outboard side 52B, a top side 52C and a bottom side 52D. Although described in connection with the second side-rail 52, it will be understood that the following description may be applied to the first side-rail 48 (i.e., in a mirror image fashion) without departing from the teachings provided herein. In the depicted examples, the first groove 56 is positioned on the inboard side 52A and proximate the top side 52C. The first groove 56 may be integrally formed (e.g., machined in, extruded, cast, molded, etc.) by the inboard side 52A of the second side-rail 52, or may be a separate component inserted into the second side rail 52. The first groove 56 is formed in an outboard direction into the second side-rail 52. The first groove 56 is sized and shaped such that one or more of the cross-rails 68 may be inserted into the first groove 56. The cross-rails 68 may be friction fit into the first grooves 56 and/or the first grooves 56 may define one or more attachment or location features configured to help locate and lock the cross-rails 68 within the first and second side rails 48, 52.

The second groove 60 is positioned below the first groove 56. It will be understood that in alternate examples, the second groove 60 may be positioned above the first groove 56. The second groove 56 may be defined on the inboard side 52A (FIG. 3A), the outboard side 52B (FIG. 3B), or both sides 52A, 52B of the second side-rail 52. In examples where the second groove 60 is positioned on the outboard side 52B, the first and second grooves 56, 60 may be positioned at substantially the same height on the second side-rail 52. According to some examples, the second groove 60 may be shallower than the first groove 56. The second groove 60 may have a depth (i.e., inward into the second rail 52) of between about 0.5 mm and about 4 mm, or between about 1.0 mm and about 2.0 mm. The second groove 60 defines a top surface 60A, an inner surface 60B, a bottom surface 60C and a groove cavity 60D. Similarly to the first groove 56, the second groove 60 may be integrally formed (e.g., machined in, extruded, cast, molded, etc.) by the second side-rail 52, or may be a separate component inserted into the rail 52. A groove hole 60E may be defined in the inner surface 60B of the second groove 60 to allow one or more electrical connections (e.g., from the lights 64) to enter into the second side-rail 52. The groove hole 60E may be punched into the inner surface 60B or may be defined in other manners known in the art. Further, a roof hole 82 may be defined by the bottom side 52D of the second side-rail 52. The roof hole 82 may correspond to the location of one of the attachment points 78, or may be positioned elsewhere along the second side-rail 52. The roof hole 82 may allow electrical connections from the lights 64 which have passed through the groove hole 60E into the second side-rail 52 to be then routed into the roof 72 of the vehicle 40. Under some circumstances, it may be advantageous to position the roof hole 82 within the attachment points 78 (FIG. 2) such that a single hole (e.g., the roof hole 82) may serve as both a securing feature and a point to route electrical connections.

Referring now to FIG. 4, the light assemblies 64 of the illuminated roof rack 44 may take a variety of configurations. In a first example, the light assemblies 64 may include a plurality of light-emitting diodes (LEDs) (e.g., light sources). For example, the light assemblies 64 may include white, amber, red, green and/or blue LEDs. Each of the LEDs may be independently activated such that a plurality of colors, patterns, or intensities may be achieved. Further, by independently activating the LEDs, moving images or patterns may be formed by the LEDs of the light assemblies 64. In another example, the light assemblies 64 may include one or more light strips 90 that are positioned along the inner surface 60B of the second groove 60. Each of the light strips 90 may include one or more light sources 94 that are oriented in one or more directions. According to at least one example, the light strip 90 may have one or more light sources 94 that emit light out of the second groove 60 onto the roof 72, or away from the vehicle 40. In other examples, the light sources 94 may emit light into the second side-rail 52 (e.g., in translucent and/or transparent examples of the side rails 48, 52). The light strips 90 may include the photoluminescent structure 10 thereon that is configured to luminesce in response to receiving excitation light 24 from the light sources 94. It will be understood that portions, or the entirety, of the light strips 90 may include the photoluminescent structure 10 without departing from the scope of the present disclosure. Further, it will be understood that the light strips 90 may be used without the photoluminescent structure 10 without departing from the teachings provided herein.

The light sources 94 may each be configured to emit visible and/or non-visible light, such as blue light, UV light, infrared, and/or violet light and may include any form of light source. For example fluorescent lighting, light emitting diodes (LEDs), organic LEDs (OLEDs), polymer LEDs (PLEDs), laser diodes, quantum dot LEDs (QD-LEDs), solid-state lighting, a hybrid of these or any other similar device, or any other form of lighting may be used without departing from the teachings provided herein. In response, the photoluminescent structure 10 (or any other luminescent structure positioned proximate the roof rack 44) may be configured to convert excitation light 24 received from the associated light source 94 into light having a wavelength in the visible spectrum (e.g., the converted light 26).

According to some examples, the photoluminescent structure 10 may be substantially non-visible when a corresponding excitation source is unilluminated. When a corresponding light source 94 is activated, the photoluminescent structure 10 may luminesce in response to receiving excitation light 24 from the light source 94. Upon illumination of an associated light source 94, the photoluminescent material 18 of the photoluminescent structure 10 may luminesce in the visible portion of the light spectrum. The photoluminescent structure 10 may be applied to the light strip 90 through painting, printing, spraying, slot coating, dip coating, roller coating, bar coating, or through the use of a film and adhesive. The photoluminescent structure 10 may include a mixture of UV and/or IR excitable photoluminescent materials 18 therein.

According to various examples, the light source(s) 94 may be deposited or printed on a substrate 98, such as a printed circuit board (PCB) containing control circuitry including light source drive circuitry for controlling activation and deactivation of the light source(s) 94. The printed light source(s) 94 may have largely-coplanar electrodes. The substrate 98 may be any type of circuit board including, but not limited to, any flexible and/or rigid circuit board. An example of light source(s) 94 that may be used with the technology described herein is described in U.S. Pat. No. 8,415,879 to Lowenthal et al., which is incorporated by reference herein.

Individual light source(s) 94 (e.g., LEDs) may be disposed (e.g., printed, laminated, captured) on the substrate 98 (e.g., a thin film having a thickness of less than 0.25 millimeters, a thin film having a thickness of 0.2 millimeters, a thin film having a thickness of 0.1 to 0.15 millimeters, a thin film having a thickness of 0.07 to 0.1 millimeters, a thin film having a thickness of 0.006 to 0.012 millimeters, a flexible thin film). The light sources 94 are depicted as discrete units, however, it will be understood that the light source(s) 94 may include tens, hundreds, and/or thousands of light source(s) 94.

According to various examples, LEDs may be used as the individual light source(s) 94. The LEDs may have a diameter ranging from about 10 microns to about 50 microns and a height ranging from about 5 microns to about 20 microns. The LED examples of the light sources 94 may have a maximum width or length, whichever is longer, ranging from about 300 microns to about 320 microns. The individual light source(s) 94 (e.g., LEDs) may have a diameter ranging from about 20 microns to about 30 microns and a height ranging from about 5 microns to about 50 microns. The LEDs may have dimensions ranging from about 230 microns to about 300 microns on one side, about 180 microns to about 200 microns on a second side, and about 50 microns to about 80 microns in height. Therefore, measurements referencing a thickness with respect to a light source 94 herein are within about 80 microns of the distance stated since the thickness of the light source(s) 94 is determined by the thickness of the substrate 98 (where thickness of the light source(s) 94 is a measure of the height of the profile of the light source(s) 94 or, equivalently, a measure of the distance from the surface of the outermost layer of the substrate 98 to the side of the light source(s) 94 disposed away from the outermost layer of the substrate 98).

Furthermore, because the maximum width of unpackaged LEDs, which may be utilized as the light source(s) 94 of the currently described light strips 90, is less than that of standard packaged LEDs, space between the center of each LED may be reduced, which may therefore increase the uniformity of the perceived light. In one example, the space between the centers of each unpackaged LED after being deposited is about 0.05 millimeters. Since LEDs produce a "point" of light and because it may desirable in some applications to have uniform light (i.e., not being able to distinguish each point of light), as a rule of thumb, the diffusing offset distance (i.e., the minimum distance at which the light emitted from an LED array is perceived as uniform) may be approximately equal to the distance between the centers of adjacent LEDs. Therefore, for an LED light source 94, the diffusing offset distance may be approximately 0.05 millimeters.

Referring still to FIG. 4, the substrate 98 includes first and second conductive traces 102, 106 for powering the light source(s) 94. Any suitable type of technology can be utilized to implement the conductive traces 102, 106. The conductive traces 102, 106 may be composed of material that is reflective, opaque, translucent and/or transparent. In some examples, the conductive traces 102, 106 may be translucent or transparent (e.g., by using indium tin oxide). The conductive traces 102, 106 may be created using conventional conductive ink or other similar processes. The conductive inks may be classed as fired high solids systems or PTF (polymer thick film) systems that allow circuits to be drawn or printed on a variety of substrate materials. These types of materials may contain conductive materials such as powdered or flaked silver and carbon-like materials. While conductive inks can be an economical way to deposit the conductive traces 102, 106, traditional industrial standards such as etching of conductive traces 102, 106 may be used on relevant substrates 98. In other examples, the conductive traces 102, 106 may be premade similarly to photo-etched copper and can have a secondary conductive bond material (e.g., solder) applied to the premade conductive traces 102, 106 to facilitate attachment.

It will be understood that the foregoing description of the light assemblies 64 may include one or more light strips 90 that incorporate a single continuous light source(s) 94 and/or a plurality of individual light source(s) 94. Further, the types of light source(s) 94 may vary from strip 90 to strip 90 or across each strip 90. In examples where there are a plurality of light source(s) 94, some or all of the light source(s) 94 may be independently electrically connected (e.g., through a conductive ink). In independently electrically connected examples of the light source(s) 94, each of the light source(s) 94 may be independently addressable, which may allow a controller to create static and dynamic patterns of light by independently illuminating certain light source(s) 94 and not others as explained in greater detail below. In some instances, a machine may function to transfer unpackaged light source(s) 94 from a substrate such as a "wafer tape" to a product substrate, such as a circuit substrate (e.g., the substrate 98). The direct transfer of unpackaged light source(s) 94 may reduce the thickness of an end product compared to a similar product produced by conventional means, as well as the amount of time and/or cost to manufacture the product substrate. Additional information on the formation of the plurality of light source(s) 94 and/or variously configured light-producing assemblies is disclosed in U.S. Patent Publication No. 2015/0136573 to Peterson et al. and U.S. Patent Publication No. 2016/0276205 to Huska et al., both of which are incorporated herein by reference.

An overmold material 114 covers, and/or contacts, the light strip 90 and/or the light source(s) 94. The overmold material 114 may be an electrically insulating material. The overmold material 114 may also be a thermally conductive thermoplastic material or a thermally conductive thermoset material that may have thermal conductivity values greater than about 1 W/m·K. If an electrically conducting material is used, then the conductive traces 102, 106, LED leads, any printed circuitry, and/or other exposed conductors are suitably coated with an insulative dielectric before disposing the overmold material 114 thereon. The overmold material 114 may be transparent, translucent, or otherwise define portions which are transparent and/or translucent. Further, portions of the overmold material 114 may be configured to function as a light guide and transmit the emitted and/or converted light 24, 26 along the first and second side-rails 48, 52.

The overmold material 114 may protect the light source(s) 94 and/or the substrate 98 from physical and chemical damage arising from environmental exposure. The overmold material 114 may have viscoelasticity (i.e., having both viscosity and elasticity), a low Young's modulus, and/or a high failure strain so that the overmold material 114 may protect the light source(s) 94 and/or the substrate 98 when contact is made thereto.

The overmold material 114 may continue to have flexible properties at low temperatures, such as temperatures below 0 degrees Celsius. The overmold material 114 may further be resistant to UV light provided by natural light source(s) and substantially resistant to weathering. According to various examples, the overmold material 114 may be formed from a material containing silicone therein.

The overmold material 114 may include or define one or include one or more lenses 118. The excitation light 24 and/or the converted light 26 may exit the overmold material 114 through the lenses 118 which may collimate, disperse, change the direction of, or otherwise alter the excitation or converted light 24, 26 emitted from the light strip 90.

The overmold material 114 may define a grommet 122 extending around the overmold material 144. The grommet 122 may integrally defined by, or adhered to, the overmold material 114. In the depicted example, the grommet 122 extends outwardly from the overmold material 114 to contact the top surface 60A and the bottom surface 60C. Such contact between the grommet 122 and the top surface 60A and the bottom surface 60C may define air pockets within the second groove 60 proximate the light strip 90, but it will be understood that the grommet 122 may substantially fill the remaining portion of the second groove 60. The grommet 122 may be flush with the inboard or outboard sides 52A, 52B of the second rail 52. Use of the grommet 122 may be advantageous in sealing and/or securing the light strip 90 within the second groove 60. Further, one or more adhesives may be utilized to secure the grommet 122 to the top and bottom surfaces 60A, 60C of the second groove 60.

The one or more light strips 90 may be adhered to the second groove 60, through an adhesive layer 126. The adhesive layer 126 may be an optically clear adhesive or an opaque adhesive depending on the application. As used herein, the term "optically clear" refers to an adhesive that may have a high light transmittance over at least a portion of the visible light spectrum (about 400 to about 700 nanometers), and that exhibits low haze. Both the luminous transmission and the haze can be determined using, for example, the method of ASTM-D 1003-95. In some examples, the adhesive layer 126 may be a "peel and stick" layer applied to the substrates 98 of the light strips 90 such that the light strips 90 may be quickly placed (e.g., reducing manufacturing time and expense).

Figure 5:
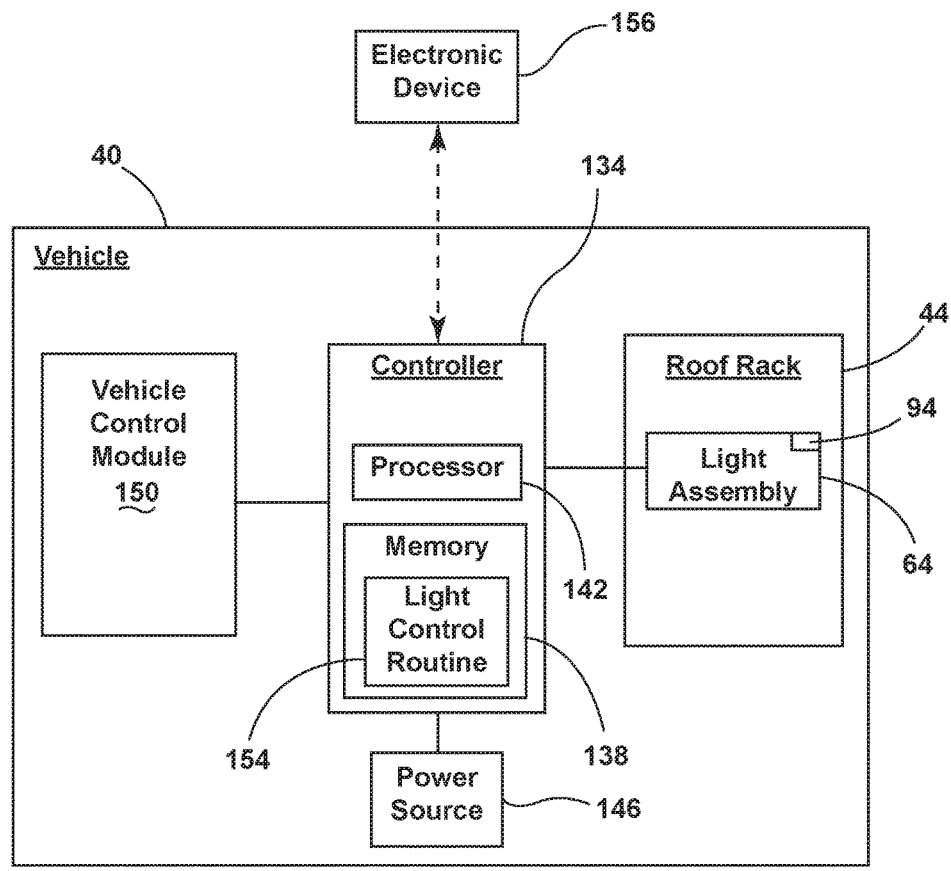
FIG. 5 is a block diagram of the vehicle, according to one example.

Referring now to FIG. 5, a block diagram of the vehicle 40 is generally shown in which the illuminated roof rack 44 is implemented. The vehicle 40 includes a controller 134 in communication with the lights 64 and/or the light source(s) 94. The controller 134 may include a memory 138 having instructions contained therein that are executed by a processor 142 of the controller 134. The controller 134 may provide electrical power to the light assembly 64 and light source(s) 94 via a power source 146 located onboard the vehicle 40. In addition, the controller 134 may be configured to control the excitation light 24 emitted from the light source(s) 94 based on feedback received from one or more inputs.

The controller 134 may receive a variety of inputs (e.g., data associated with various statuses of the vehicle 40) from one or more vehicle control modules 150. The vehicle control modules 150 may include, but are not limited to, a body control module, engine control module, steering control module, brake control module, a Bluetooth control module, a wireless connectivity module, the like and/or combinations thereof. The vehicle control modules 150 may be configured to provide a variety of inputs to the controller 134. The inputs may correspond to a variety of statuses of the vehicle 40, including speed, acceleration, rate of acceleration, direction of travel (e.g., forward or rearward, east, west, north, south), brake activation, headlight activation or deactivation, door state, turn signal lever state, occupancy status, reservation status, service status, locked or unlocked states, key fob activation, vehicle engine on or off, vehicle orientation (e.g., on its side, roof 72, or upright), stability system activation (e.g., an automatic brake system activation, traction control system activation, vehicle or trailer sway, etc.), alarm system activation, mechanical system alerts (e.g., low oil, low tire pressure, battery issues, check engine light, etc.), cruise control activation, hazard system activation, air bag deployment, proximity to objects and persons, autonomous driving system activation, as well as other statuses of the vehicle 40. It will be understood that receiving no input from a particular vehicle system (e.g., braking) may also be determined as status of the vehicle 40 (e.g., not braking).

Based on the detected statuses of the vehicle 40, the processor 142 may activate one or more routines stored within the memory 138 of the controller 134. For example, the memory 138 may include a light control routine 154 to activate one or more of the light assemblies 64 in response to the detected input, or to a change in the detected input (e.g., no input to a positive input, positive input to no input, change in the type of input, detection of multiple inputs, etc.) from the vehicle control module 150. The light control routine 154 may change the intensity (e.g., increase, decrease), color, pattern and/or activation order for each of the light assemblies 64 and/or one or more of the light source(s) 94. By controlling the light emitted from the light source(s) 94, the light assemblies 64 may luminesce in a variety of colors and/or patterns to provide an aesthetic appearance. Further, the illumination of the light assemblies 64 may provide vehicle information to an intended observer (e.g., a person proximate the vehicle 40, pedestrian, another vehicle driver, etc.). The illumination determined by the light control routine 154 may be predefined (e.g., by a manufacturer, local law, industry standard, etc.) or may be set by a user of the vehicle 40. For example, a manufacturer may predefine the braking input to cause red light to be emitted from the lights 64, while a user may preset the illumination (e.g., pattern, color, intensity, etc.) of aesthetic and functional lighting provided by the lights 64 (e.g., door locks, key fob activation, welcome and farewell sequences, etc.). Further, different users of the vehicle 40 may have different preset illumination preferences.

According to various examples, the light control routine 154 may be activated based on one or more statuses related to a ridesharing service. For example, the input may come from one or more electronic devices 156 (i.e., with or without network, server, and computer intermediaries) within and/or around the vehicle 40. For example, an input may come from a mobile example of the electronic device 156 (e.g., cell phone, tablet, laptop, etc.). Inputs from such electronic devices 156 may correspond to a ridesharing service. For example, the electronic device 156 may communicate an input related to a brand of ridesharing service being utilized (e.g., Uber®, Lyft®, Wingz®, Sidecar®, etc.), a reservation status (e.g., accepting new clients, occupied, reserved by another client, headed to new location, not in service, etc.), time until the vehicle 40 will depart from its location and/or other inputs related to ridesharing services (e.g., surge pricing). As such, the inputs from the electronic device may correspond to a vehicle status as it is what a driver or user of the electronic device intends to do with the vehicle 40. According to various examples, electronic device 156 (e.g., through the ridesharing service) may communicate a confirmation code (e.g., pattern, color, etc.) to be displayed by the light assemblies 64. Additionally or alternatively, the confirmation code may issued by the ridesharing service to the vehicle 40 and the electronic device 156. Use of such a confirmation code may be advantageous in allowing quick and easy identification of the vehicle 40 to a client of the ridesharing service.

Figure 6:
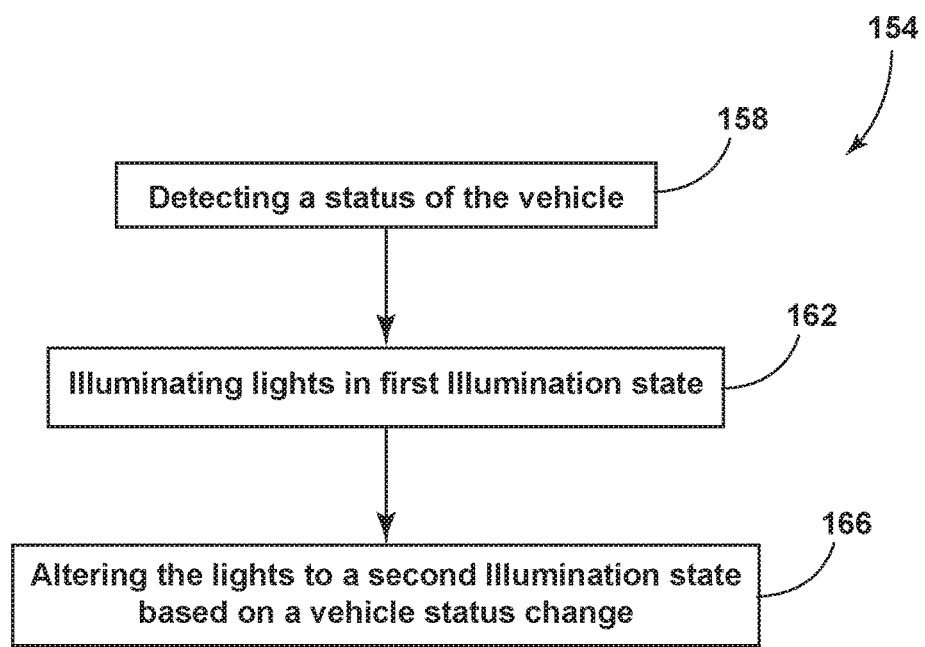
FIG. 6 is a flow chart of a vehicle process, according to one example.

Referring now to FIGS. 5 and 6, the light control routine 154 may begin with step 158 of detecting a status of the vehicle 40. As explained above, the detected status of the vehicle 40 may be sensed condition of the vehicle 40 corresponding to any number of vehicle systems or the lack of an input from those systems. Next, a step 162 of illuminating the lights 64 in a first illumination state is performed. The first illumination state may be a state of activating some or all of the lights 64, or of not activating any of the lights 64. The first illumination state may correspond to a predefined, or a user defined, pattern, intensity, activation order and/or color. Step 158 of detecting the status of the vehicle 40 may trigger the light control routine 154 to activate the light assemblies 64 and/or the light source(s) 94. Additionally or alternatively, step 162 of illuminating the lights 64 may not be in response to any particular input, but rather running lights or general illumination. Next, step 166 of altering the illumination of the lights 64 to a second illumination state based on the detection in the change of a status of the vehicle 40 is performed. Alteration of the illumination of the lights 64 to the second illumination state may be effectuated by changing the color, pattern, intensity, cycle time, and/or activation order of the lights 64. It will be understood that the steps of the light control routine 154 may be performed in any order, simultaneously and/or omitted.

According to a first example of the light control routine 154, a detected status of the vehicle 40 (e.g., step 158) may be that the vehicle 40 is locked. The light assemblies 64 may not be active (e.g., the first illumination state of step 162). A user of the vehicle 40 may use a key fob or other keyless entry device of the vehicle 40 to unlock the vehicle 40. The controller 134 may detect a change in the input from the keyless entry system (e.g., step 166) and flash (e.g., in a user defined or manufacturer defined) the light assemblies 64 in a pattern, color or intensity (e.g., step 166).

According to another example of the light control routine 154, the controller 134 may receive an input corresponding to the direction of travel of the vehicle 40 (e.g., step 158). The controller 134 may configure the light assemblies 64 to activate in a first color (e.g., step 162). As the vehicle 40 changes direction, the controller 134 may detect and altered status in the direction of travel and change the light assemblies 64 to a second color based on the new direction of travel (e.g., step 166).

According to another example of the light control routine 154, the controller 134 may detect a crash (e.g., detecting the status of the vehicle 40 from step 158) with an occupant in the vehicle 40 (e.g., through the occupant detection systems) and illuminate the lights 64 in an amber color (e.g., the first illumination state of step 162) to indicate to first responders that a person is still within the vehicle 40. After detection of a door of the vehicle 40 opening (e.g., detecting a change in the status of the vehicle 40 of step 166) the light control routine 154 may change the color or end activation of the lights 64 (e.g., the second illumination state of step 166) to indicate to first responders that the occupant is no longer within the vehicle 40.

According to another example, the vehicle 40 and the light control routine 154 may be utilized in conjunction with a ridesharing service. For example, the light control routine 154 may receive an input indicative of a brand of ridesharing service the vehicle 40 is being utilized in (e.g., detection of a status of the vehicle of step 158). In return, the light control routine 154 may activate the lights 64 to a predefined color, intensity, and/or pattern to indicate the ridesharing company (e.g., the first illumination state of step 162). Next, the light control routine 154 may alter lighting from the lights 64 to the second illumination state of step 166 based on a reservation status (e.g., the detection of the altered status of step 166), departure or arrival times, or availability. For example, the second illumination state may include certain colors, patterns, intensities, and/or flashing which may indicate that the vehicle 40 is getting ready to depart/arrive, a time remaining before the vehicle 40 departs (e.g., by changing from green, to yellow to red as depart time approaches), the vehicle 40 is available for hire, already reserved, not in service and/or part of a particular ridesharing fleet.

According to another example, the light control routine 154 may be configured to indicate at least one of a vehicle direction and vehicle speed based on the inputs. For example, the routine 154 may detect the speed or direction of the vehicle 40 (e.g., step 158), illuminate (e.g., step 162)

the lights 64 to indicate the direction (e.g., illuminate the lights 64 in the direction the vehicle 40 is moving) and/or speed (e.g., select an intensity for the lights 64), and change the illumination of the lights 64 if the direction or speed of the vehicle 40 changes (e.g., step 166). It will be understood that the vehicle 40 going from a stationary configuration to a moving configuration would result in changed status for both the direction and speed of the vehicle 40.

Use of the present disclosure may offer a variety of advantages. First, use of the light assemblies 64 allows for a low profile addition to the roof rack 44 which provides both functional and aesthetic lighting to the vehicle 40. Second, use of the illuminated roof rack 44 allows the direction and speed (e.g., through the illumination of the roof rack 44) to be quickly determined by persons around the vehicle 40. Third, the use of a user selectable pattern for the light assemblies 64 when a key fob is activated may allow a user of the vehicle 40 to quickly determine the location of the vehicle 40. Fourth, use of the light control routine 154 in conjunction with various vehicle safety systems may allow for first responders arriving at a vehicle crash to quickly determine whether the occupants of the vehicle 40 have departed or not. Fifth, utilizing the light control routine 154 in conjunction with a ridesharing service may allow users (e.g., drivers and passengers) of the vehicle 40 to efficiently communicate with one another, as well as persons around the vehicle 40. It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle roof rack, comprising:
   a first and a second side-rail, each of the rails defining:
      a second groove defined below a first groove and on an opposite side of the rail than the first groove; and
      a plurality of lights positioned within the second groove, wherein the rail defines a groove hole for electrical connection to the plurality of lights;
   a transparent overmold defining a grommet contacting the second groove positioned away from the groove hole, wherein a groove cavity is defined between the grommet and an inner wall of the second cavity and extends a length of the transparent overmold; and
   a cross-rail extending between the first and second side rails.

2. The vehicle of claim 1, wherein the second groove is shallower than the first groove.

3. The vehicle of claim 2, wherein the second groove has a depth of between about 0.5 mm and about 4 mm.

4. The vehicle of claim 1, wherein each of the second grooves comprise two lights extending through the second grooves.

5. The vehicle of claim 1, wherein at least one of the lights comprises a photoluminescent structure.

6. The vehicle of claim 5, wherein the lights are configured to emit an excitation emission which is converted by the photoluminescent structure to a converted light.

7. The vehicle of claim 1, wherein each of the lights comprise a light strip having a plurality of light sources positioned along the light strip.

* * * * *